(12) United States Patent
Fujioka et al.

(10) Patent No.: US 10,295,754 B2
(45) Date of Patent: May 21, 2019

(54) POSITION DETERMINATION METHOD AND ELEMENT

(71) Applicant: NALUX CO., LTD., Osaka-shi, Osaka (JP)

(72) Inventors: Takahiro Fujioka, Osaka (JP); Hironori Horikiri, Osaka (JP); Katsumoto Ikeda, Osaka (JP)

(73) Assignee: NALUX CO., LTD., Osaka-Shi, Osaka (JP)

( * ) Notice: Subject to any disclaimer, the term of this patent is extended or adjusted under 35 U.S.C. 154(b) by 0 days.

(21) Appl. No.: 15/967,974

(22) Filed: May 1, 2018

(65) Prior Publication Data

US 2018/0329154 A1 Nov. 15, 2018

(30) Foreign Application Priority Data

May 11, 2017 (WO) .................. PCT/JP2017/017867
Dec. 14, 2017 (JP) ................................. 2017-239493

(51) Int. Cl.
*G02B 6/38* (2006.01)
*G01B 11/00* (2006.01)
*G01B 11/14* (2006.01)

(52) U.S. Cl.
CPC .......... *G02B 6/3825* (2013.01); *G01B 11/002* (2013.01); *G01B 11/14* (2013.01);
(Continued)

(58) Field of Classification Search
CPC .. G02B 6/3825; G02B 6/3865; G02B 6/3882; G02B 6/3885; G02B 6/381;
(Continued)

(56) References Cited

U.S. PATENT DOCUMENTS 6,287,017 B1 * 9/2001 Katsura .................. B29C 33/44
249/64
2003/0206650 A1 11/2003 Gladnick
(Continued)

FOREIGN PATENT DOCUMENTS

JP 2004-004055 A 1/2004
JP 2007-317845 A 12/2007
(Continued)

OTHER PUBLICATIONS

International Search Report & Written Opinion dated Aug. 1, 2017 corresponding to International Patent Application No. PCT/JP2017/017867.

*Primary Examiner* — Michael P Mooney
(74) *Attorney, Agent, or Firm* — Squire Patton Boggs (US) LLP

(57) ABSTRACT

A position determination method for determining a position of a point on a flat surface by observing the position of the point and a position of a fiducial portion on the flat surface in an image of a measuring system provided with an imaging optical system using coaxial episcopic illumination is provided. The fiducial portion is in the shape of a pillar at least in the basal portion and provided with an inclined surface surrounding the foot of the pillar. The method includes the steps of determining a position of the outer boundary of the foot from the boundary between the inclined surface and the flat surface in the image; determining the position of the fiducial portion from the position of the outer boundary of the foot; and determining the position of the point with respect to the position of the fiducial portion.

7 Claims, 17 Drawing Sheets

(52) U.S. Cl.
CPC ............ *G02B 6/385* (2013.01); *G02B 6/3883* (2013.01); *G02B 6/3885* (2013.01)

(58) Field of Classification Search
CPC .... G02B 6/3821; G02B 6/3833; G02B 6/385; G02B 6/387; G02B 6/3883; G02B 6/3887; G02B 6/3893; G01B 11/002; G01B 11/14
USPC ...................................................... 385/53–87
See application file for complete search history.

(56) References Cited

U.S. PATENT DOCUMENTS

| | | |
|---|---|---|
| 2007/0275520 A1 | 11/2007 | Suzuki |
| 2009/0154878 A1 | 6/2009 | Noguchi |
| 2014/0294354 A1 | 10/2014 | Hung |

FOREIGN PATENT DOCUMENTS

| | | |
|---|---|---|
| JP | 2008216905 A | 9/2008 |
| JP | 2009-145656 A | 7/2009 |
| JP | 2014-137410 A | 7/2014 |

\* cited by examiner

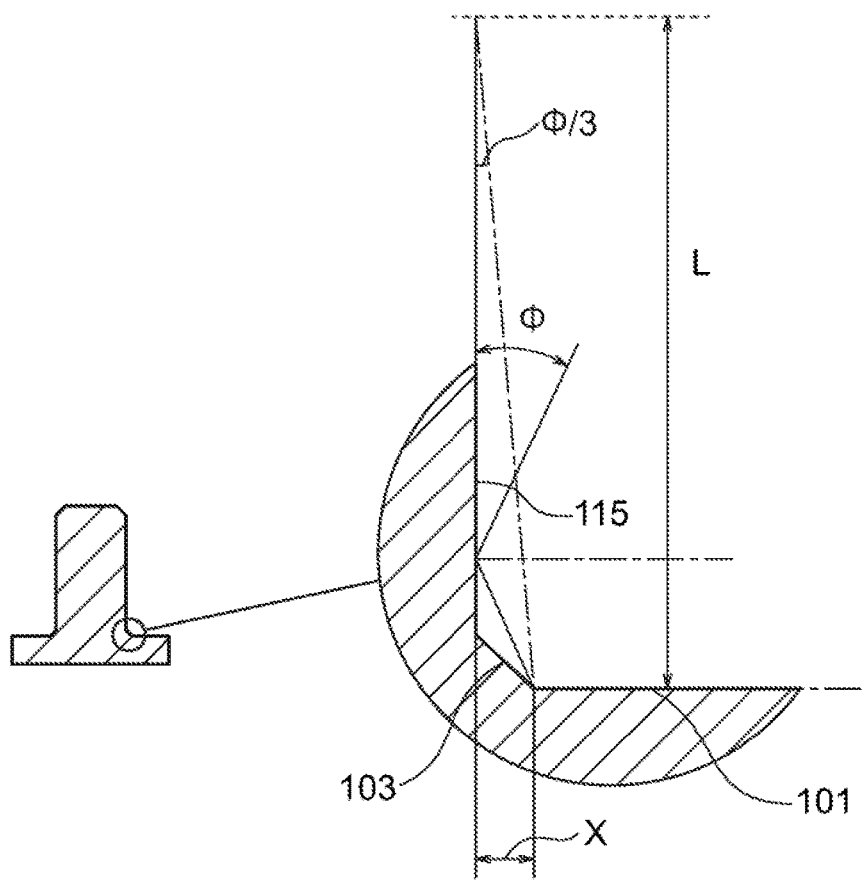

POSITION DETERMINATION METHOD AND ELEMENT

BACKGROUND

Technical Field

The present invention relates to a position determination method for determining a position using an image of a measuring system provided with an imaging optical system using coaxial episcopic illumination and an element that is suited for the above-described position determination method.

Background Art

For example, a case can be supposed where in order to connect an element provided with a plurality of lenses arranged on a surface thereof and a connector provided with optical fibers, a fiducial portion that is a protrusion in the shape of a pillar provided on the surface of the element is engaged in a recessed portion provided on the connector. In such a case, for alignment of each lens and each optical fiber, a distance between the fiducial portion and each lens of the element needs to be guaranteed with a high accuracy. Accordingly, the distance between the fiducial portion and each lens of the element needs to be measured with a high accuracy. Such measurement is carried out using a measuring system such as a CNC (Computer Numerical Control) image measuring system (for example, JP200404055A).

In measurement of the distance between the fiducial portion and each lens of the element on the surface, a position of the fiducial portion in the shape of a pillar on the surface needs to be accurately determined in an image of a measuring system. Conventionally it has been difficult to recognize a position of the foot of the pillar of the fiducial portion in an image of a measuring system, and therefore a position of the top portion of the pillar of the fiducial portion has been recognized, a position of the fiducial portion has been determined from the position of the top portion, and a position of each lens has been determined with respect to the position of the fiducial portion.

However, if the pillar of the fiducial portion is inclined with respect to a normal to the surface, for example, in an image that is taken from the direction of the normal, a space is generated between a position of the foot and the corresponding position of the top portion of the fiducial portion. Accordingly, when a position of the fiducial portion is determined from the position of the top portion and then a position of each lens is determined with respect to the position of the fiducial portion, an error of distance corresponding to the space described above is generated.

Under the above-described situation, a position determination method for determining a position of a lens or the like using a position of a fiducial portion of an element using an image of a measuring system with a high accuracy and an element suited for the above-described method have not been developed.

PRIOR ART DOCUMENT

Patent Document

Patent document 1: JP200404055A

Accordingly, there is a need for a position determination method for determining a position of a lens or the like using a position of a fiducial portion of an element in an image of a measuring system and an element suited for the above-described method. The object of an embodiment of the present invention is to provide a position determination method for determining a position of a lens or the like using a position of a fiducial portion of an element in an image of a measuring system and an element suited for the above-described method.

SUMMARY OF THE INVENTION

A position determination method according to an embodiment of the present invention is a position determination method for determining a position of a point on a flat surface by observing the position of the point and a position of a fiducial portion on the flat surface in an image of a measuring system provided with an imaging optical system using coaxial episcopic illumination. The fiducial portion is in the shape of a pillar at least in the basal portion and being provided with an inclined surface surrounding the foot of the pillar. The position determination method includes the steps of determining a position of the outer boundary of the foot from the boundary between the inclined surface surrounding the foot and the flat surface in the image of the measuring system; determining the position of the fiducial portion from the position of the outer boundary of the foot; and determining the position of the point with respect to the position of the fiducial portion.

According to the position determination method according to the present embodiment, in an image of the measuring system, a position of the outer boundary of the foot is determined from the boundary between the inclined surface surrounding the foot and the flat surface in the image of the measuring system, and then the position of the fiducial portion is determined from the position of the outer boundary of the foot. Accordingly, an error in position determination can be significantly reduced in comparison with the case in which the position of the fiducial portion is determined from a position of the top portion of a pillar.

In the position determination method according to another embodiment of the first aspect of the present invention, when the angular aperture of the image-forming optical system is represented as $\phi$ and the acute angle between the inclined surface surrounding the foot and the flat surface is represented as $\theta$, the relationship $$\phi < \theta$$

is satisfied.

When the above-described relationship is satisfied, a ray of light that has been reflected by the inclined surface does not reach the measuring system. Accordingly, in an image obtained by the measuring system, the area of the inclined surface does not appear bright, and therefore the boundary between the area of the flat surface and the area of the inclined surface is made clear.

In the position determination method according to another embodiment of the first aspect of the present invention, when the angular aperture of the image-forming optical system is represented as $\phi$, the acute angle between the inclined surface surrounding the foot and the flat surface is represented as $\theta$, and degree is used as the unit of angle, the relationship $$\theta \leq (90 - \phi)$$

is satisfied.

When the above-described relationship is satisfied, a ray of light that has been reflected by the flat surface and then by the inclined surface does not reach the measuring system.

Accordingly, in an image obtained by the measuring system, the area of the inclined surface does not appear bright, and therefore the boundary between the area of the flat surface and the area of the inclined surface is made clear.

In the position determination method according to another embodiment of the first aspect of the present invention, the inclined surface surrounding the foot is configured so as to connect the flat surface and the side of the pillar or to connect the flat surface and another flat surface that is parallel to the flat surface.

In the position determination method according to another embodiment of the first aspect of the present invention, when the inclined surface connects the flat surface and the side of the pillar, the angular aperture of the image-forming optical system is represented as $\phi$, the length of the inclined surface in the direction perpendicular to the central axis of the pillar in a cross section containing the central axis of the pillar is represented as X, and the length of the pillar is represented as L, the relationship $$X \leq L \tan(\phi/3)$$

is satisfied.

According to the present embodiment, a considerable amount of rays of light that have reached the flat surface around the border between the flat surface and the inclined surface with an angle of incidence of $\phi$ or less and have been reflected by the flat surface is reflected by the side of the pillar and then reaches the measuring system. Accordingly, in an image of the measuring system, the area of the flat surface appears sufficiently bright, and the border between the area of the flat surface and the area of the inclined surface is made clear.

In the position determination method according to another embodiment of the first aspect of the present invention, the position of the point is a point on an optical element.

According to the present embodiment, a position of the optical element can be determined with respect to the position of the fiducial portion with a high accuracy.

An element according to another embodiment of the present invention is an element provided with at least two fiducial portions and an optical element, the fiducial portions and the optical element being installed on a flat surface or a plurality of flat surfaces that are parallel to one another wherein each fiducial portion is in the shape of a pillar at least in the basal portion and provided with a inclined surface surrounding the foot of the pillar and the angle of the inclined surface with the flat surface on which said each fiducial portion is installed ranges from 20 degrees to 70 degrees.

The element according to the present embodiment is suited for use in determining a position of the optical element with respect to the fiducial portions with a high accuracy using an image of a measuring system provided with an imaging optical system using coaxial episcopic illumination.

In the element according to another embodiment of the present invention, the inclined surface surrounding the foot of the pillar is configured so as to connect the flat surface on which said each fiducial portion is installed and the side of the pillar or to connect the flat surface on which said each fiducial portion is installed and another flat surface that is parallel to the flat surface.

BRIEF DESCRIPTION OF DRAWINGS

FIG. 11 illustrates a relationship between the length X of the inclined surface in the direction perpendicular to the central axis in a cross section containing the central axis of the pillar and the length L of the pillar;

DESCRIPTION OF EMBODIMENTS

Figure 1:
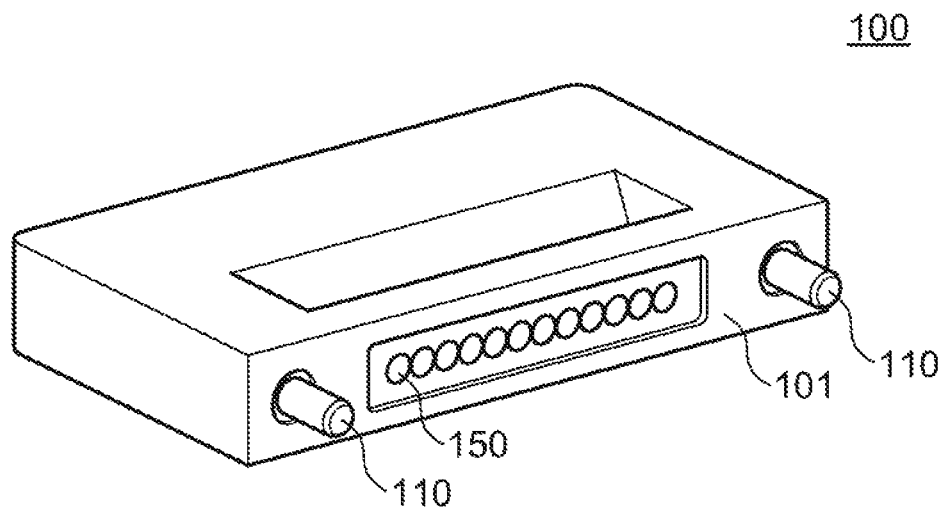
FIG. 1 shows an element provided with fiducial portions according to an embodiment of the present invention.

FIG. 1 shows an element 100 provided with fiducial portions 110 according to an embodiment of the present invention. On a surface 101 of the element 100, two fiducial portions 110 and a plurality of lenses 150 are installed. The two fiducial portions 110 are substantially in the shape of a cylindrical column. The element 100 provided with the plurality of lenses 150 is to be connected to a connector provided with a plurality of optical fibers, for example. The two fiducial portions 110 are used to connect the element 100 to the connector. For example, the connector may be provided with two recessed portions corresponding to the two fiducial portions 110 in the shape of a pillar and the two fiducial portions 110 may be configured to be accommodated in the two recessed portions. In this case, the plurality of lenses 150 and the plurality of optical fibers need to be aligned with a high accuracy. In order to guarantee the alignment with a high accuracy, positions of the plurality of lenses 150 need to be measured with respect to the two fiducial portions 110 with a high accuracy.

Figure 2:
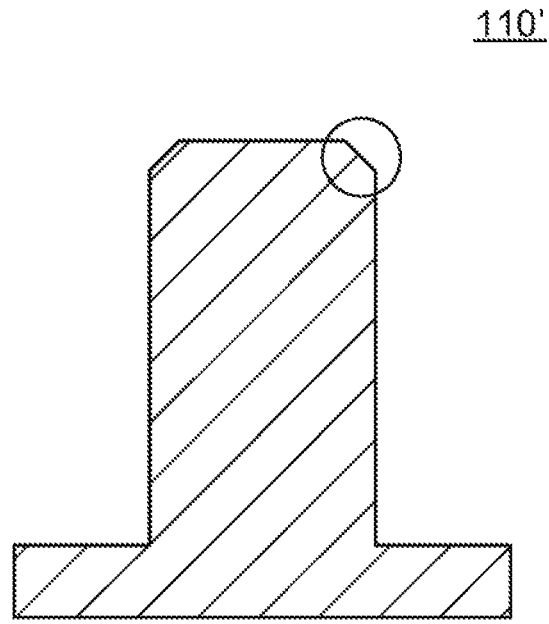
FIG. 2 shows a cross section containing the central axis of a fiducial portion of a conventional element.

FIG. 2 shows a cross section containing the central axis of a fiducial portion 110' of a conventional element.

Measurement of positions of the plurality of lenses 150 are carried out using a measuring system such as a CNC (Computer Numerical Control) image measuring system. In an image taken by the measuring system such as an image measuring system, the foot of a fiducial portion 110' of the conventional element can hardly be distinguished from the surrounding area of the flat surface. Accordingly, in an image taken by the measuring system such as an image measuring system, the top portion of the pillar, which is circled in FIG. 2 is observed to determine a position of the fiducial portion 110'.

Figure 3:
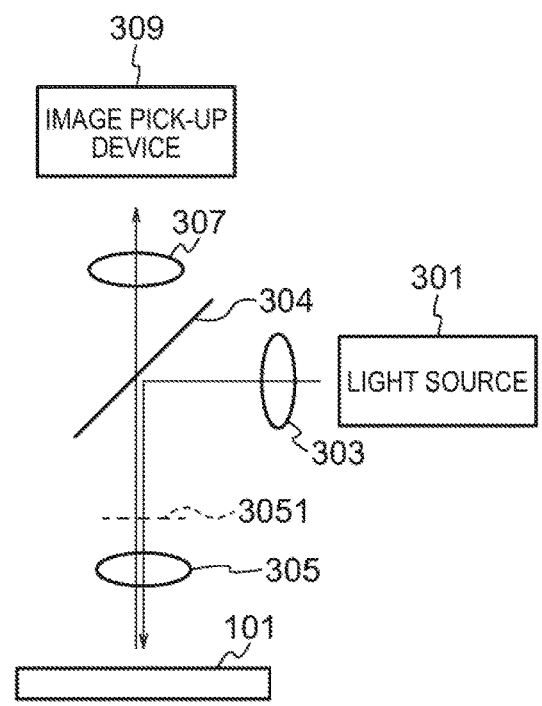
FIG. 3 shows a measuring system using coaxial episcopic illumination used for conventional measuring methods and the measuring method according to the present invention.

FIG. 3 shows a measuring system using coaxial episcopic illumination used for conventional measuring methods and the measuring method according to the present invention. As the measuring system, a CNC image measuring system may be used. The measuring system includes a light source 301, a field lens 303, a half mirror 304, a condenser lens 305, an imaging lens 307 and an image pick-up device 309. The light source 301, the field lens 303, the half mirror 304 and the condenser lens 305 constitute an illumination optical system of the measuring system. The condenser lens 305, the half mirror 304 and the imaging lens 307 constitute an image-forming optical system of the measuring system. A surface of an element 100 provided with fiducial portions 110 is represented as 101. Light from the light source 301 travels via the field lens 303 and the half mirror 304 and forms an image of the light source at the position 3051 of the pupil of the condenser lens 305. The surface 101 of the element 100 is illuminated via the condenser lens 305 by the image of the light source that functions as a light source. Light reflected on the surface 101 of the element 100 passes through the condenser lens 305, the half mirror 304 and the imaging lens 307 and reaches the image pick-up device 309.

Figure 4:
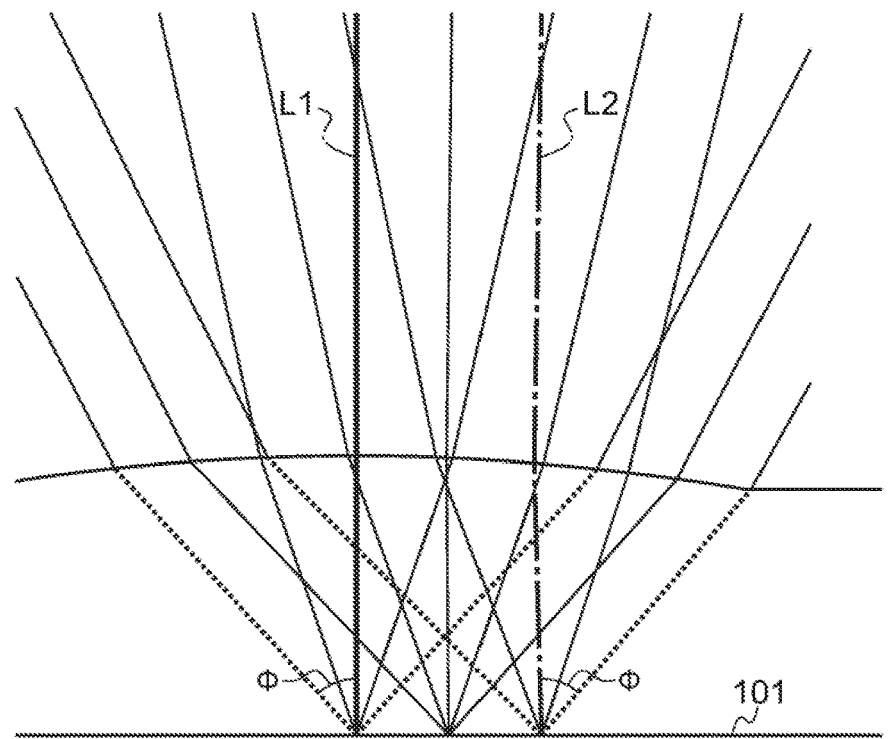
FIG. 4 shows optical paths of light for coaxial episcopic illumination and the reflected light used for image-forming in the above-described measuring system.

FIG. 4 shows optical paths of light for coaxial episcopic illumination and the reflected light used for image-forming in the above-described measuring system. The above-described paths are determined by the angular aperture of the image-forming optical system of the above-described measuring system, that is, the angular aperture of the condenser lens 305. In FIG. 4, the principal ray that coincides with the straight line that passes through the center of the pupil of the condenser lens 305 and is perpendicular to the flat surface 101 is represented as L1, and the principal ray that reaches a point on the flat surface 101 that is most distant from the point at which the principal ray L1 reaches the flat surface 101 is represented as L2. The principal rays L1 and L2 can be considered to be substantially parallel to each other, and the angular aperture of the principal ray L1 and the angular aperture of the principal ray L2 are substantially equal to each other. The angular aperture is represented as $\phi$. Among rays of the reflected light, a ray that forms an angle that is greater than the angular aperture $\phi$ with a normal to the flat surface 101 is not received by the measuring system.

Figure 5:
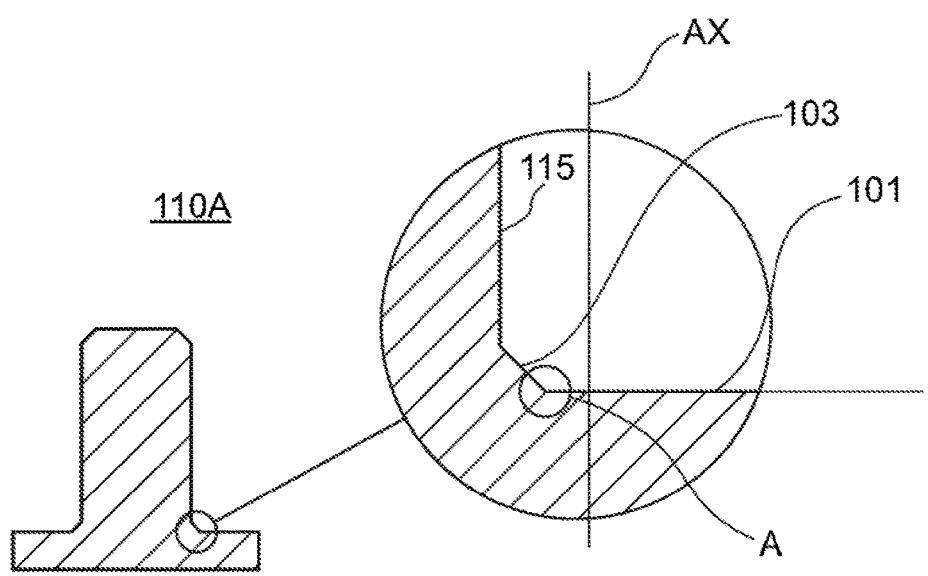
FIG. 5 shows a cross section containing the central axis of a fiducial portion of an element according to the first embodiment of the present invention.

FIG. 5 shows a cross section containing the central axis of a fiducial portion 110A of an element 100A according to the first embodiment of the present invention. A pillar 115 of the fiducial portion 110A of the element 100A is in the shape of a cylindrical column, and is configured such that the central axis of the cylindrical column is perpendicular to a flat surface 101. The element 100A according to the embodiment of the present invention differs from conventional elements in that the fiducial portion 110A is provided with an inclined surface 103 surrounding the foot of the pillar 115 of the fiducial portion 110A. The inclined surface 103 connects the flat surface 101 and the side of the pillar 115 of the fiducial portion 110A. The boundary between the inclined surface 103 and the flat surface 101 is in the shape of a circle, and the center of the circle is located at the point of intersection of the above-described central axis and the flat surface 101. The circled drawing in FIG. 5 shows a cross section containing the above-described central axis of the inclined surface 103. The flat surface 101 should preferably be finished such that the surface roughness is 30 nm or less. Further, the flat surface 101 should preferably be formed so as to be identical with a plane on which the lenses 150 are arranged.

In FIG. 5, an axis AX is perpendicular to the flat surface 101, and the direction of the axis is that of the principal rays shown in FIG. 4.

The corner marked with A in FIG. 5 should preferably be formed without a circular segment, that is, without a round section in the cross section.

Figure 6:
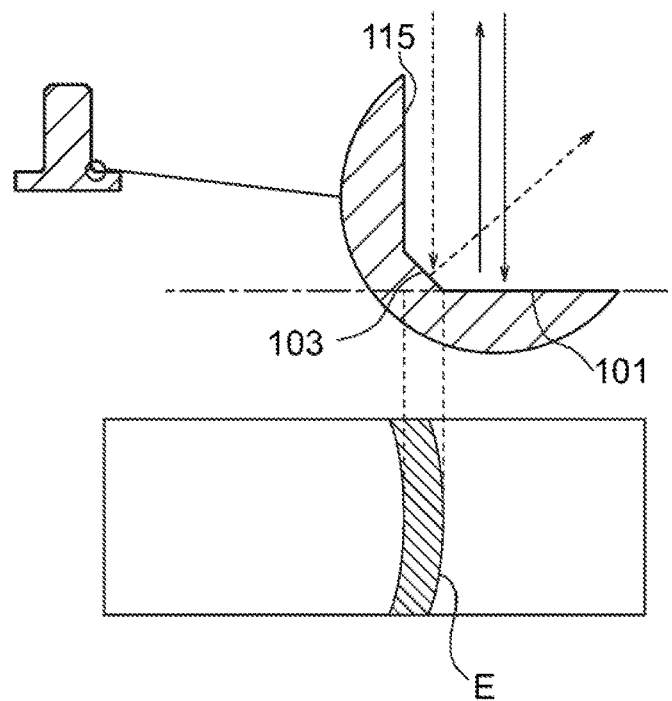
FIG. 6 shows optical paths of rays of light that travels perpendicular to the flat surface among rays of light for illumination, and an image made by the rays of light.

FIG. 6 shows optical paths of rays of light that travel perpendicular to the flat surface 101 among rays of light for illumination, and an image made by the rays of light that travel perpendicular to the flat surface 101. The reflected ray of a ray of light that is incident normally to the flat surface 101 travels in the direction perpendicular to the flat surface 101, and therefore reaches the image pick-up device 309. On the other hand, when a ray of light that travels in the direction perpendicular to the flat surface 101 is reflected by the inclined surface 103, the ray does not reach the image pick-up device 309. Accordingly, in an image taken by the image pick-up device 309, the area of the flat surface 101 appears bright and the area of the inclined surface 103 appears dark. As a result, in the image the boundary E between the area of the flat surface 101 and the area of the inclined surface 103 is shown clearly.

Figure 7:
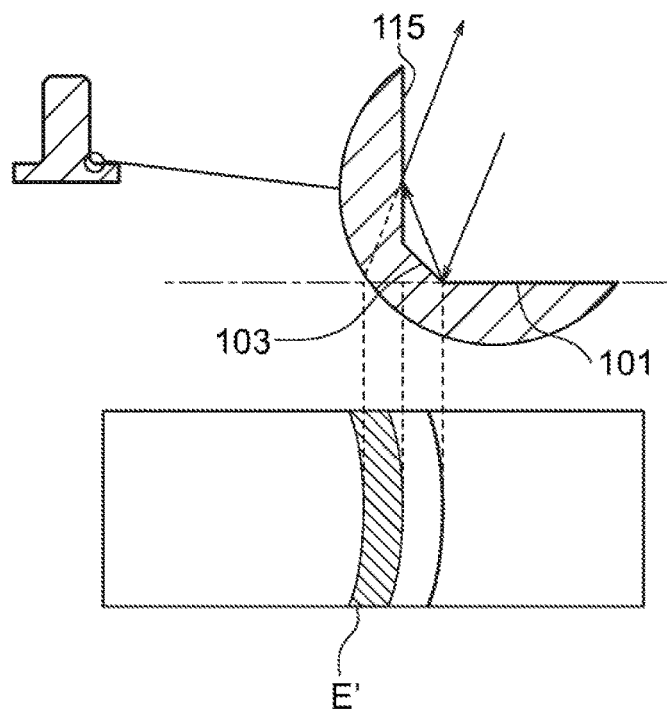
FIG. 7 shows an optical path of ray of light that travels in the direction at an angle in a predetermined range with the flat surface 101 among rays of light for illumination, and an image made by rays of light that travel in the direction.

FIG. 7 shows an optical path of ray of light that travels in the direction at an angle in a predetermined range with the flat surface 101 among rays of light for illumination, and an image made by rays of light that travel in the direction. Rays of light that are incident to the flat surface 101 at an angle in the predetermined range with the flat surface 101 are reflected by the flat surface 101 and the side of the pillar 115 and then reach the image pick-up device 309. On the other hand, when the rays of light that travels in the direction at an angle in the predetermined range with the flat surface 101 are reflected by the inclined surface 103, the reflected rays do not reach the image pick-up device 309. Accordingly, in an image formed by rays of light that are reflected by the side of the pillar 115 and taken by the image pick-up device 309, the area of the flat surface 101 appears bright and the area of the inclined surface 103 appears dark. As a result, in the above-described image the boundary E' between the area of the flat surface 101 and the area of the inclined surface 103 is shown clearly.

Figure 8:
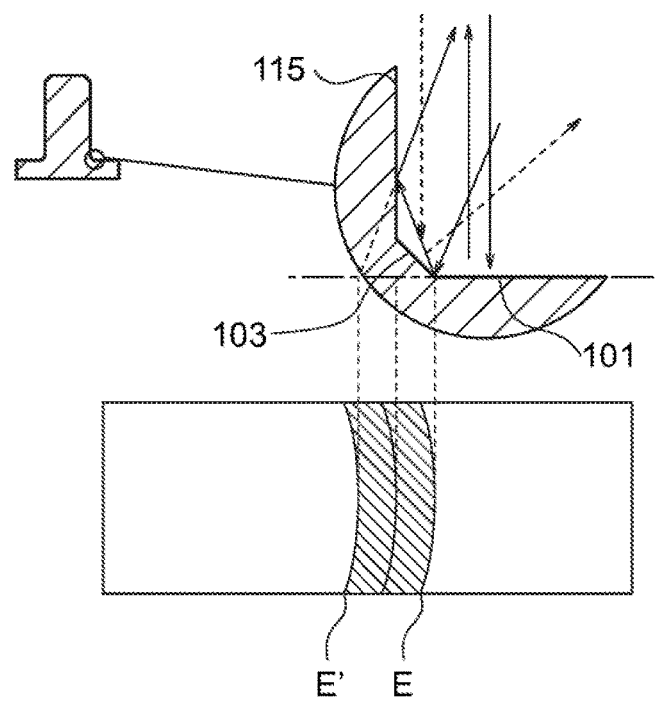
FIG. 8 shows optical paths of rays of light for illumination, and an image made by the rays of light.

FIG. 8 shows optical paths of rays of light for illumination, and an image made by the rays of light. FIG. 8 is a combination of FIG. 6 and FIG. 7. In FIG. 8, the boundary E' is an image of the boundary E between the area of the flat surface 101 and the area of the inclined surface 103 formed by reflection on the side of the pillar 115. Accordingly, the midpoint of the line segment connecting a point on the boundary E and the corresponding point on the boundary E' corresponds to a point on the outer boundary of the pillar 115 on the flat surface 101. Thus, from the image shown in FIG. 8, the outer boundary of the pillar 115 on the flat surface 101 can be located. How to locate the outer boundary of the pillar 115 on the flat surface 101 will be described in detail later.

An angle of the inclined surface 103 with the flat surface 101 will be described below. In the text of specification the unit of degree is degree.

Figure 9A:
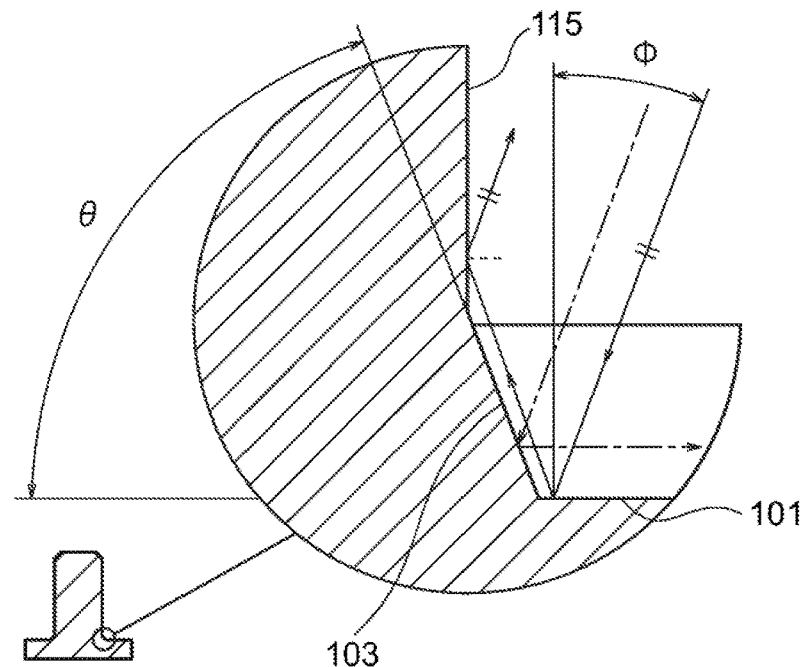
FIG. 9A illustrates a relationship between the angle (an acute angle) $\theta$ of the inclined surface with the flat surface and the angular aperture $\phi$ of the imaging optical system of the measuring system.

FIG. 9A illustrates a relationship between an angle (an acute angle) $\theta$ of the inclined surface 103 with the flat surface 101 and the angular aperture $\phi$ of the imaging optical system of the measuring system. In FIG. 9A, the relationship $$\theta \le (90-\phi)$$

is satisfied. In this case, a ray of light that has been reflected by the flat surface 101 and then by the inclined surface 103 does not reach the image pick-up device 309. Accordingly, in an image obtained by the measuring system, the area of the inclined surface 103 does not appear bright, and therefore the boundary E' between the area of the flat surface 101 and the area of the inclined surface 103 is made clear.

Figure 9B:
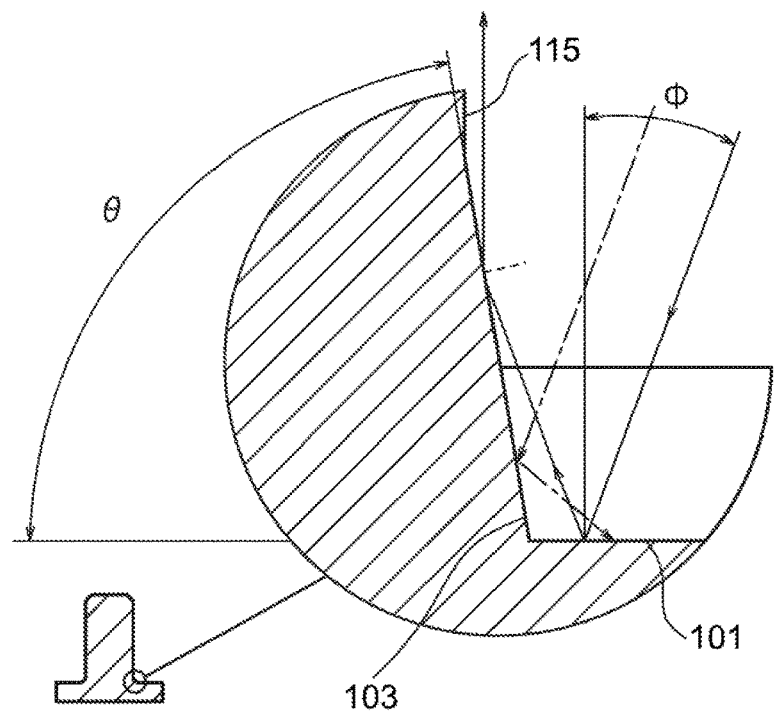
FIG. 9B illustrates a relationship between the angle (an acute angle) $\theta$ of the inclined surface with the flat surface and the angular aperture of the imaging optical system of the measuring system.

FIG. 9B illustrates a relationship between an angle (an acute angle) $\theta$ of the inclined surface 103 with the flat surface 101 and the angular aperture of the imaging optical system of the measuring system. In FIG. 9B, the relationship $$(90-\phi)<\theta$$

is satisfied. In this case, some of the rays of light that have been reflected by the flat surface 101 and then by the inclined surface 103 reach the image pick-up device 309. Accordingly, in an image obtained by the measuring system, the area of the inclined surface 103 appears bright, and therefore the boundary E' between the area of the flat surface 101 and the area of the inclined surface 103 is not made clear.

Figure 10A:
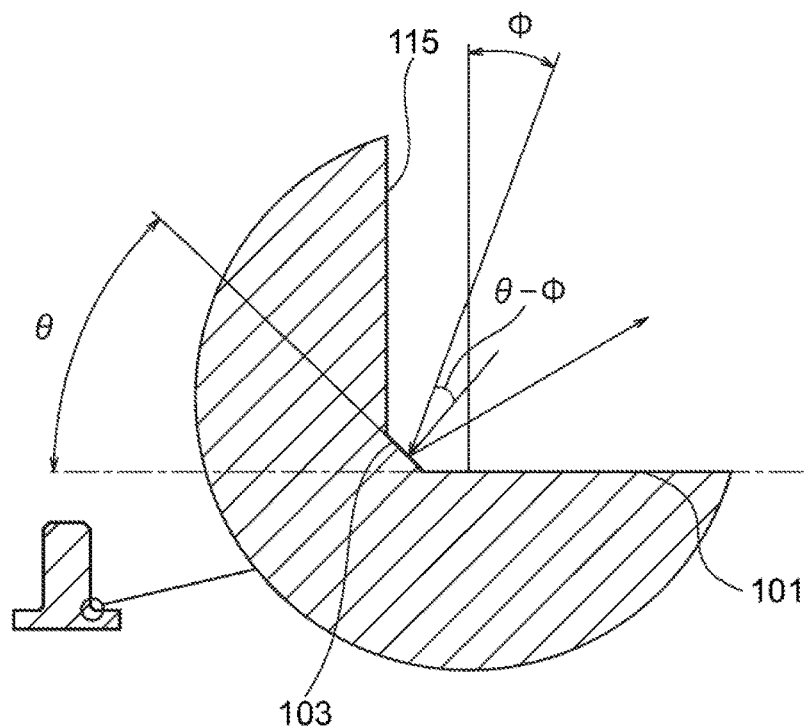
FIGS. 10A and 10B illustrate a relationship between the angle (an acute angle) $\theta$ of the inclined surface with the flat surface and the angular aperture $\phi$ of the imaging optical system of the measuring system.

FIG. 10A illustrates a relationship between an angle (an acute angle) $\theta$ of the inclined surface 103 with the flat surface 101 and the angular aperture $\phi$ of the imaging optical system of the measuring system. In FIG. 10A the relationship $$\phi<\theta$$

is satisfied. In this case, a ray of light that has been reflected by the inclined surface 103 does not reach the image pick-up device 309. Accordingly, in an image obtained by the measuring system, the area of the inclined surface 103 does not appear bright, and therefore the boundary E between the area of the flat surface 101 and the area of the inclined surface 103 is made clear.

Figure 10B:
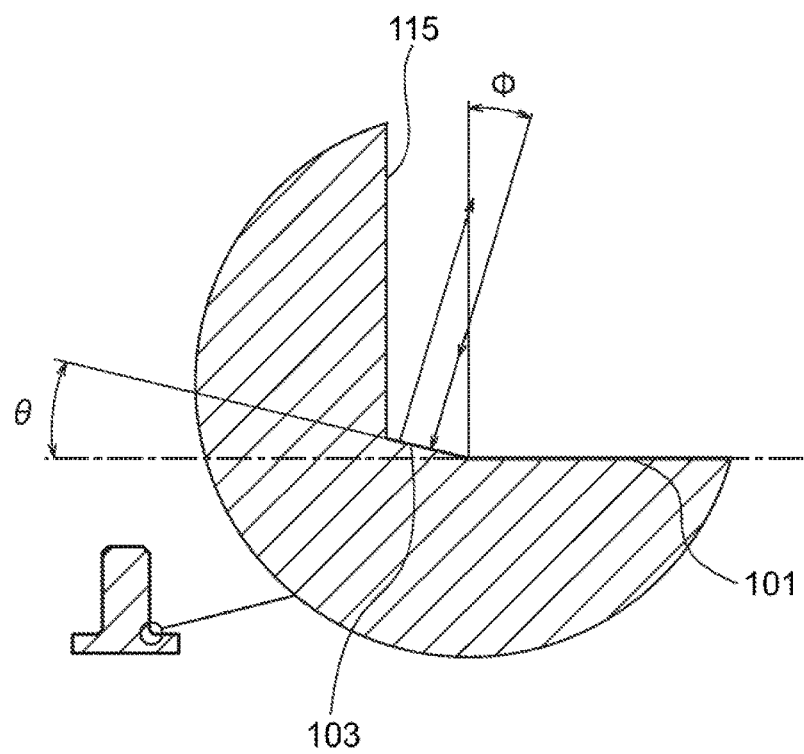

FIG. 10B illustrates a relationship between an angle (an acute angle) $\theta$ of the inclined surface 103 with the flat surface 101 and the angular aperture of the imaging optical system of the measuring system. In FIG. 10B, the relationship $$\theta \le \phi$$

is satisfied. In this case, a ray of light that has been reflected by the inclined surface 103 reaches the image pick-up device 309. Accordingly, in an image obtained by the measuring system, the area of the inclined surface 103 appears bright, and therefore the boundary E between the area of the flat surface 101 and the area of the inclined surface 103 is not made clear. Thus, this state is not preferable from the stand point of measurement using the image.

Accordingly, an angle (an acute angle) $\theta$ of the inclined surface 103 with the flat surface 101 and the angular aperture $\phi$ of the imaging optical system of the measuring system should preferably satisfy the following relationship.

$$\phi<\theta \le (90-\phi)$$

In general, the angular aperture $\phi$ of the imaging optical system of the measuring system ranges from 10 degrees to 20 degrees. Accordingly, an angle of the inclined surface 103 with the flat surface 101 should preferably be in a range from 20 degrees to 70 degrees.

FIG. 11 illustrates a relationship between the length X of the inclined surface 103 in the direction perpendicular to the central axis in a cross section containing the central axis of the pillar 115 and the length L of the pillar. In order that a considerable amount of rays that have been reflected at a point on the border between the flat surface 101 and the inclined surface 103 is reflected by the side of the pillar 115 and reaches the measuring system, the following relationship should preferably be satisfied when the angular aperture of the imaging optical system of the measuring system is represented as $\phi$.

$$X \le L \tan(\phi/3)$$

Further, the length X should preferably be 0.01 mm or more in order to obtain a clear image. On the other hand, the limit of resolution d of the measuring system is expressed by the following expression when the f-number of the measuring system is represented as fno.

$$d=2.44 \times \lambda \times f_{no}$$

Substituting $\lambda=0.55$ μm and fno=0.4 to the expression, d=0.537 μm is obtained. As shown in FIG. 8, in an image obtained by the measuring system, there exist an image of the inclined surface that is directly observed and an image of the inclined surface that is observed through reflection. Accordingly, from the standpoint of the limit of resolution d alone, the length X needs to be d/2 or greater.

Figure 12:
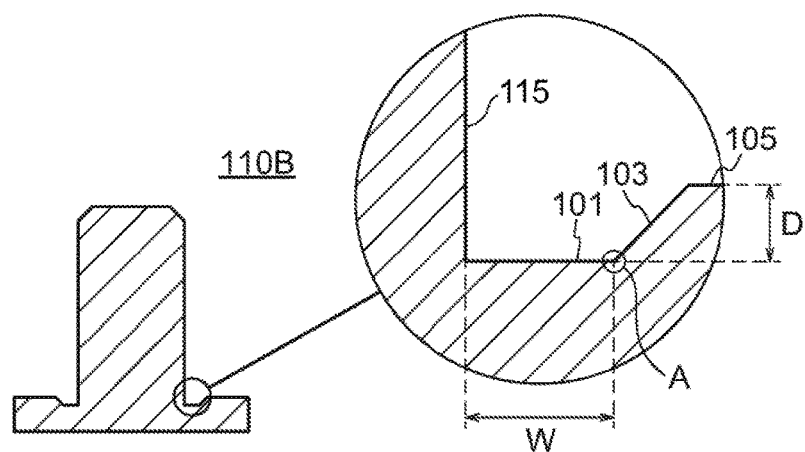
FIG. 12 shows a cross section containing the central axis of a fiducial portion of an element according to the second embodiment of the present invention.

FIG. 12 shows a cross section containing the central axis of a fiducial portion 110B of an element 100B according to the second embodiment of the present invention. A pillar 115 of the fiducial portion 110B of the element 100B is in the shape of a cylindrical column, and is configured such that the central axis of the cylindrical column is perpendicular to the flat surface 101. The circled drawing in FIG. 12 shows a cross section containing the central axis of the portion in the vicinity of the foot of the cylindrical column. The flat surface 101 is surrounded by the annular inclined surface 103, and the annular inclined surface 103 connects the flat surface 101 and a flat surface 105 that is parallel to and is D distant from the flat surface 101. The boundary between the flat surface 101 and the inclined surface 103 is in the shape of a circle, and the center of the circle lies at the point of intersection of the above-described central axis and the flat surface 101. In the present embodiment, the flat surface 101 and the inclined surface 103 form a groove surrounding the pillar 115. In the cross section, the width of the flat surface 101 in the direction perpendicular to the central axis, that is, the width of the groove is W. The flat surface 101 should preferably be formed so as to be identical with a plane on which the lenses 150 are arranged.

The corner marked with A in FIG. 12 should preferably be formed without a circular segment, that is, a round section in the cross section.

Figure 13:
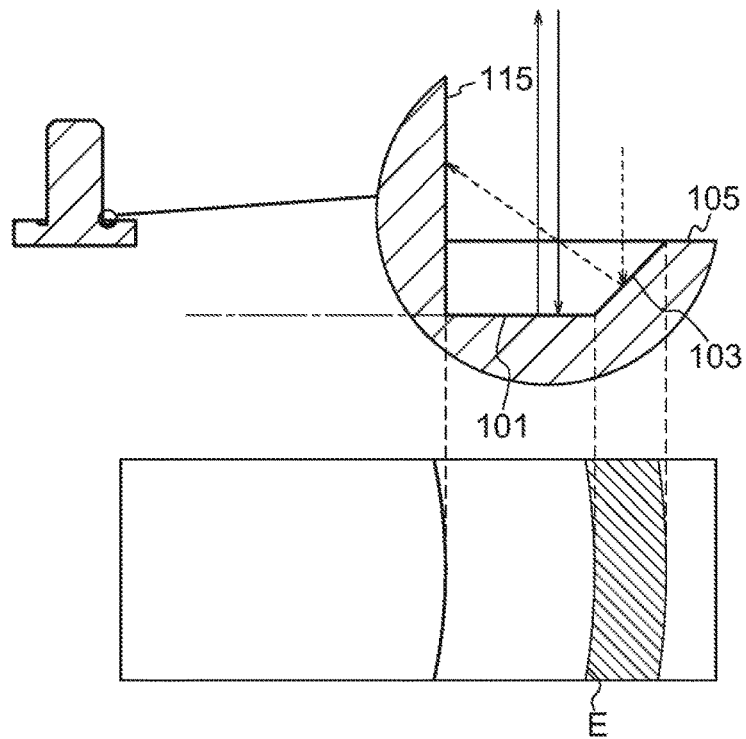
FIG. 13 shows optical paths of rays of light that travels perpendicular to the flat surface among rays of light for illumination.

FIG. 13 shows optical paths of rays of light that travel perpendicular to the flat surface 101 among rays of light for illumination and an image made by the rays of light that travel perpendicular to the flat surface 101. The reflected ray of a ray of light that is incident normally to the flat surface 101 travels in the direction perpendicular to the flat surface 101, and therefore reaches the image pick-up device 309. Similarly, the reflected ray of a ray of light that is incident normally to the flat surface 105 reaches the image pick-up device 309. On the other hand, when a ray of light that travels in the direction perpendicular to the flat surface 101 is reflected by the inclined surface 103, the ray is further reflected by the side of the pillar 105 and does not reach the image pick-up device 309. Accordingly, in an image taken by the image pick-up device 309, the areas of the flat surface 101 and the flat surface 105 appear bright and the area of the inclined surface 103 appears dark. As a result, in the image the boundary E between the area of the flat surface 101 and the area of the inclined surface 103 is shown clearly.

Figure 14:
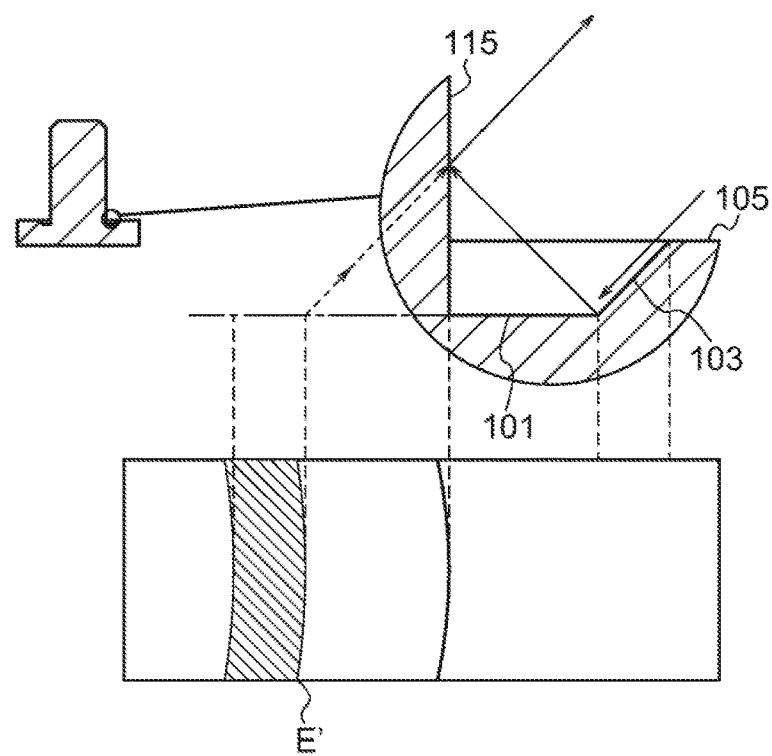
FIG. 14 shows an optical path of a ray of light that travels in the direction at an angle in a predetermined range with the flat surface 101 among rays of light for illumination, and an image made by rays of light that travels in the direction.

FIG. 14 shows an optical path of a ray of light that travels in the direction at an angle in a predetermined range with the flat surface 101 among rays of light for illumination, and an image made by rays of light that travels in the direction. Rays of light that are incident to the flat surface 101 at an angle in the predetermined range with the flat surface 101 are reflected by the flat surface 101 and the side of the pillar 115 and then reach the image pick-up device 309. Similarly, the reflected ray of a ray of light that is incident to the flat surface 105 reaches the image pick-up device 309. On the other hand, even when a ray of light that travels in the direction at an angle in the predetermined range with the flat surface 101 is reflected by the inclined surface, the ray is further reflected by the side of the pillar 115 and do not reach the image pick-up device 309. Accordingly, in an image formed by rays of light that are reflected by the side of the pillar 115 and taken by the image pick-up device 309, the areas of the flat surface 101 and the flat surface 105 appear bright and the area of the inclined surface 103 appears dark. As a result, in the above-described image the boundary E' between the area of the flat surface 101 and the area of the inclined surface 103 is shown clearly.

Figure 15:
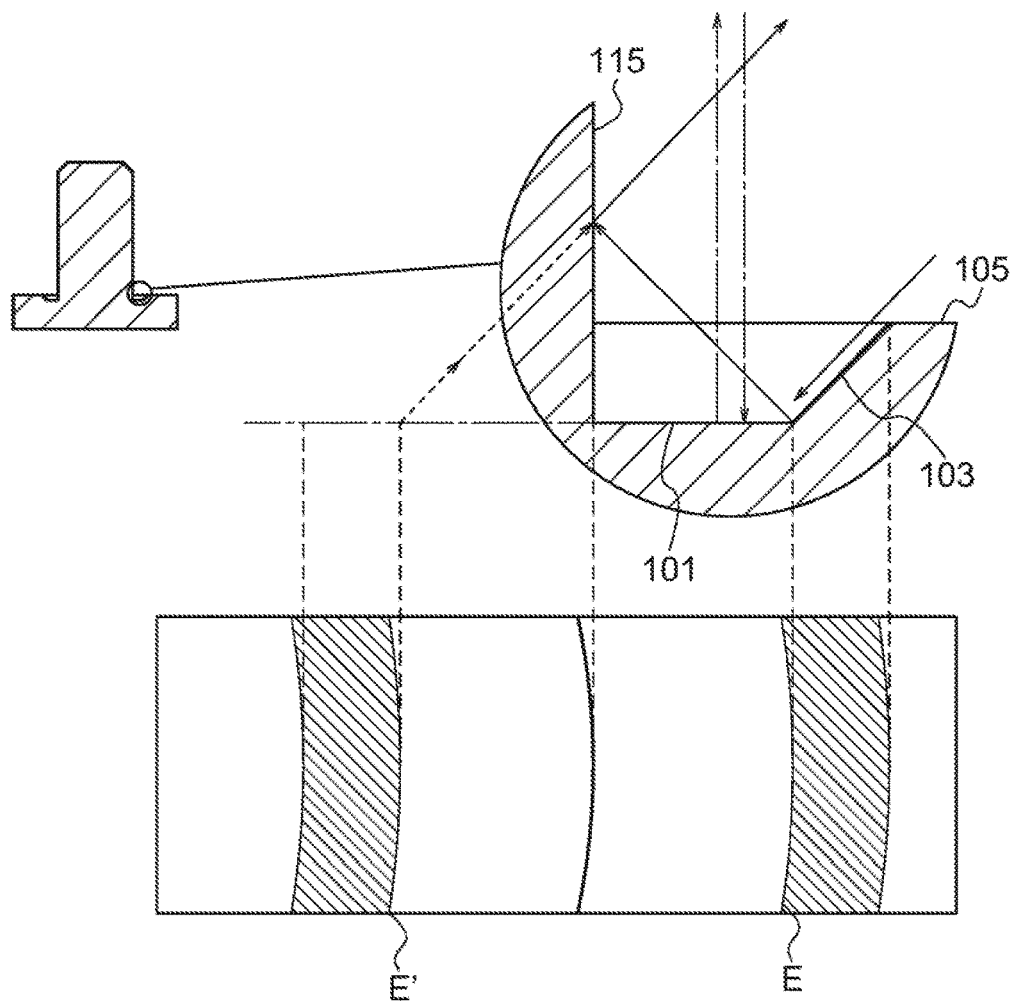
FIG. 15 shows optical paths of rays of light for illumination, and an image made by the rays of light.

FIG. 15 shows optical paths of rays of light for illumination, and an image made by the rays of light. FIG. 15 is a combination of FIG. 13 and FIG. 14. In FIG. 15, the boundary E' is an image of the boundary E between the area of the flat surface 101 and the area of the inclined surface 103 formed by reflection on the side of the pillar 115. Accordingly, the midpoint of the line segment connecting a point on the boundary E and the corresponding point on the boundary E' corresponds to a point on the outer boundary of the pillar 115 on the flat surface 101. Thus, from the image shown in FIG. 15, the outer boundary of the pillar 115 on the flat surface 101 can be located. How to locate the outer boundary of the pillar 115 on the flat surface 101 will be described in detail later.

An angle of the inclined surface 103 with the flat surface 101 will be described below. In the text of specification the unit of degree is degree.

Figure 16A:
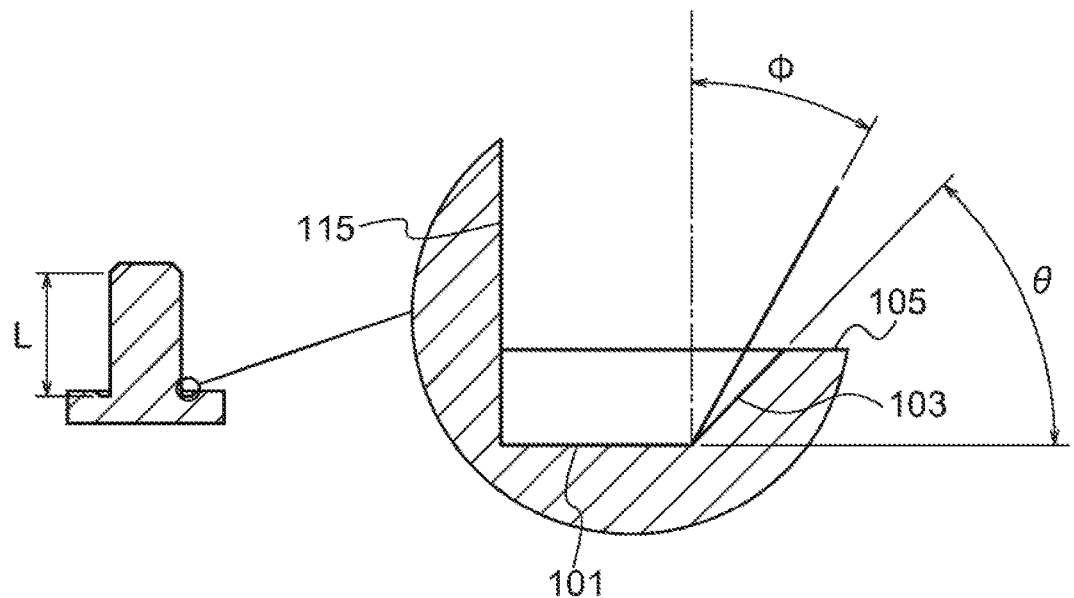
FIG. 16A illustrates a relationship between the angle (an acute angle) $\theta$ of the inclined surface with the flat surface and the angular aperture $\phi$ of the imaging optical system of the measuring system.

FIG. 16A illustrates a relationship between an angle (an acute angle) $\theta$ of the inclined surface 103 with the flat surface 101 and the angular aperture $\phi$ of the imaging optical system of the measuring system. In FIG. 16A, the relationship $$\theta \leq (90 - \phi)$$

is satisfied. In this case, most of the rays of light for illumination reach the flat surface 101.

Figure 16B:
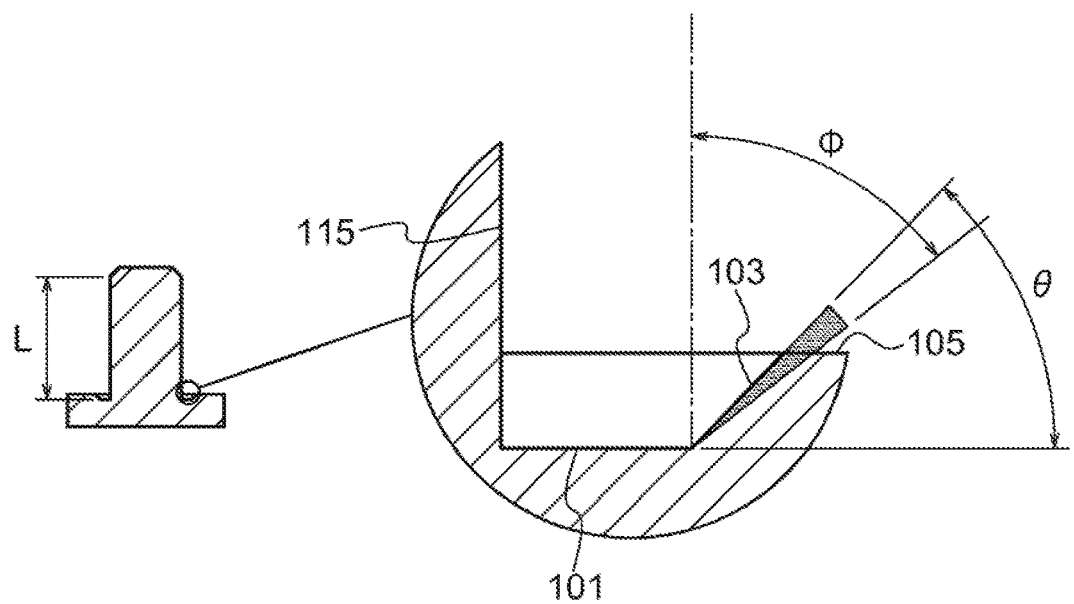
FIG. 16B illustrates a relationship between the angle (an acute angle) $\theta$ of the inclined surface with the flat surface and the angular aperture of the imaging optical system of the measuring system.

FIG. 16B illustrates a relationship between an angle (an acute angle) $\theta$ of the inclined surface 103 with the flat surface 101 and the angular aperture of the imaging optical system of the measuring system. In FIG. 16B, the relationship $$(90 - \phi) < \theta$$

is satisfied. In this case, some of the rays of light for illumination cannot reach the flat surface 101 due to vignetting caused by the flat surface 105. Thus, this state is not preferable from the stand point of the efficiency of illumination.

Figure 17A:
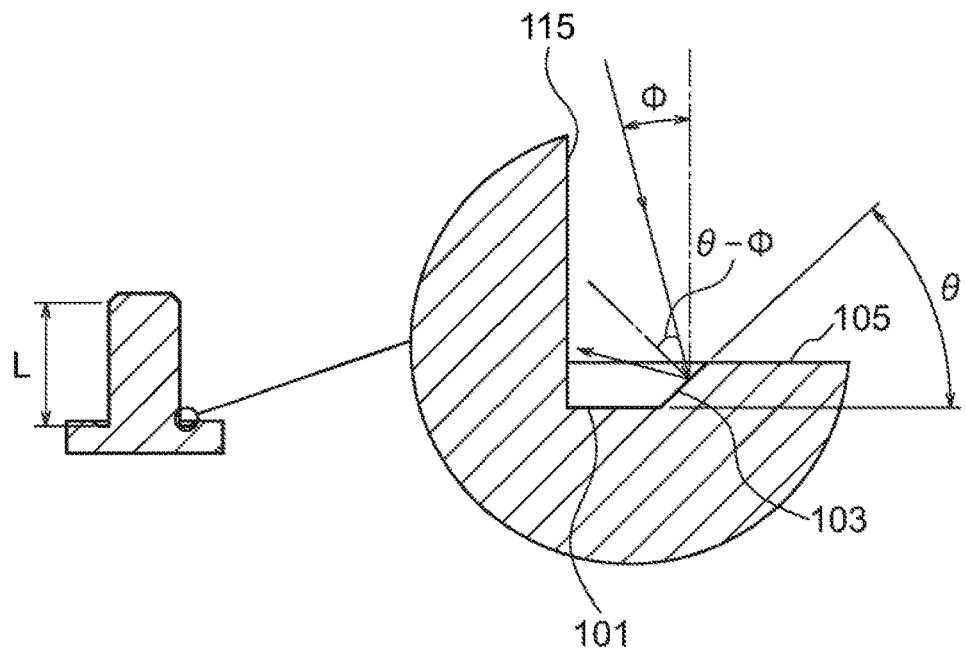
FIGS. 17A and 17B illustrate a relationship between the angle (an acute angle) $\theta$ of the inclined surface with the flat surface and the angular aperture $\phi$ of the imaging optical system of the measuring system.

FIG. 17A illustrates a relationship between an angle (an acute angle) $\theta$ of the inclined surface 103 with the flat surface 101 and the angular aperture $\phi$ of the imaging optical system of the measuring system. In FIG. 17A, the relationship $$\phi < \theta$$

is satisfied. In this case, a ray of light that has been reflected by the inclined surface 103 does not reach the image pick-up device 309. Accordingly, in an image obtained by the measuring system, the area of the inclined surface 103 does not appear bright, and therefore the boundary E between the area of the flat surface 101 and the area of the inclined surface 103 is made clear.

Figure 17B:
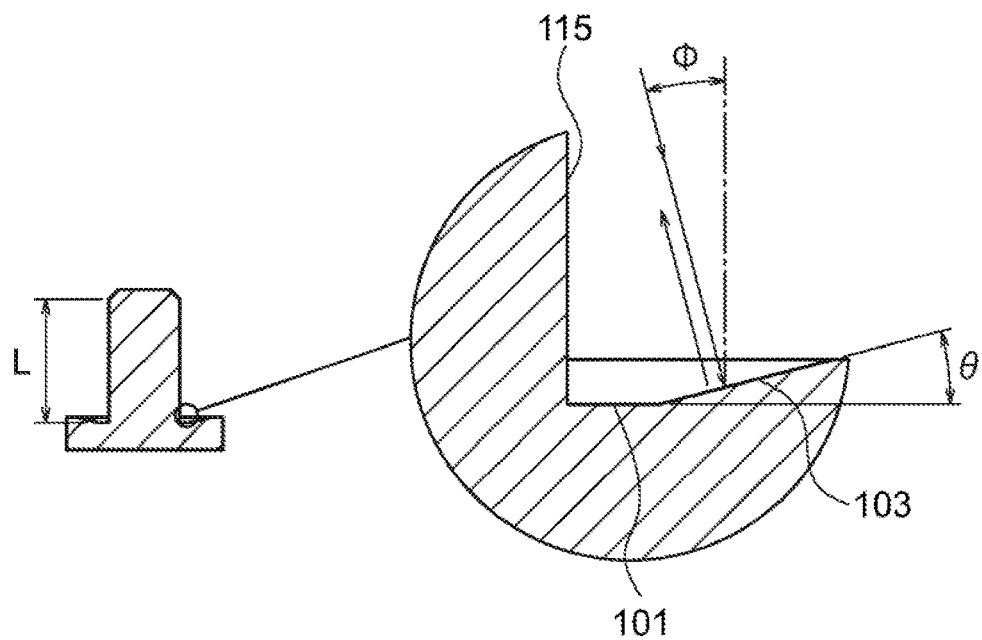

FIG. 17B illustrates a relationship between the angle (an acute angle) $\theta$ of the inclined surface 103 with the flat surface 101 and the angular aperture of the imaging optical system of the measuring system. In FIG. 17B, the relationship $$\theta \leq \phi$$

is satisfied. In this case, some of rays of light that have been reflected by the inclined surface 103 reach the image pick-up device 309. Accordingly, in an image obtained by the measuring system, the area of the inclined surface 103 appears bright, and therefore the boundary E between the area of the flat surface 101 and the area of the inclined surface 103 is not made clear. Thus, this state is not preferable from the stand point of measurement using the image.

Accordingly, an angle (an acute angle) $\theta$ of the inclined surface 103 with the flat surface 101 and the angular aperture $\phi$ of the imaging optical system of the measuring system should preferably satisfy the following relationship.

$$\phi < \phi \geq (90 - \phi)$$

In general, the angular aperture $\phi$ of the imaging optical system of the measuring system ranges from 10 degrees to 20 degrees. Accordingly, the angle of the inclined surface 103 with the flat surface 101 should preferably be in a range from 20 degrees to 70 degrees.

Figure 18:
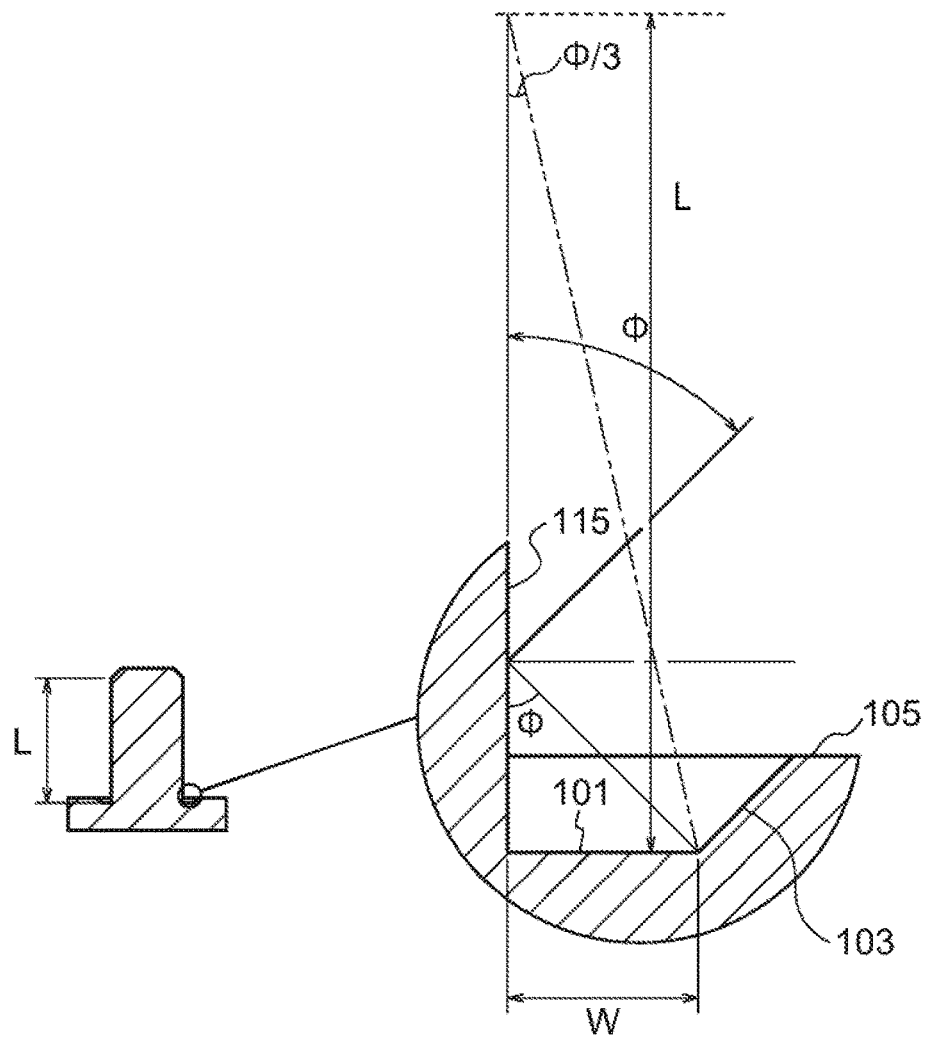
FIG. 18 illustrates a relationship between the width W of the groove and the length L of the pillar.

FIG. 18 illustrates a relationship between the width W of the groove and the length L of the pillar 115. In order that a considerable amount of rays that have been reflected at a point on the border between the flat surface 101 and the inclined surface 103 is reflected by the side of the pillar 115 and reaches the measuring system, the following relationship should preferably be satisfied when the angular aperture of the imaging optical system of the measuring system is represented as φ.

$$X \leq L \tan(\phi/3)$$

Further, the width W should preferably be 0.01 mm or more in order to obtain a clear image.

Figure 19:
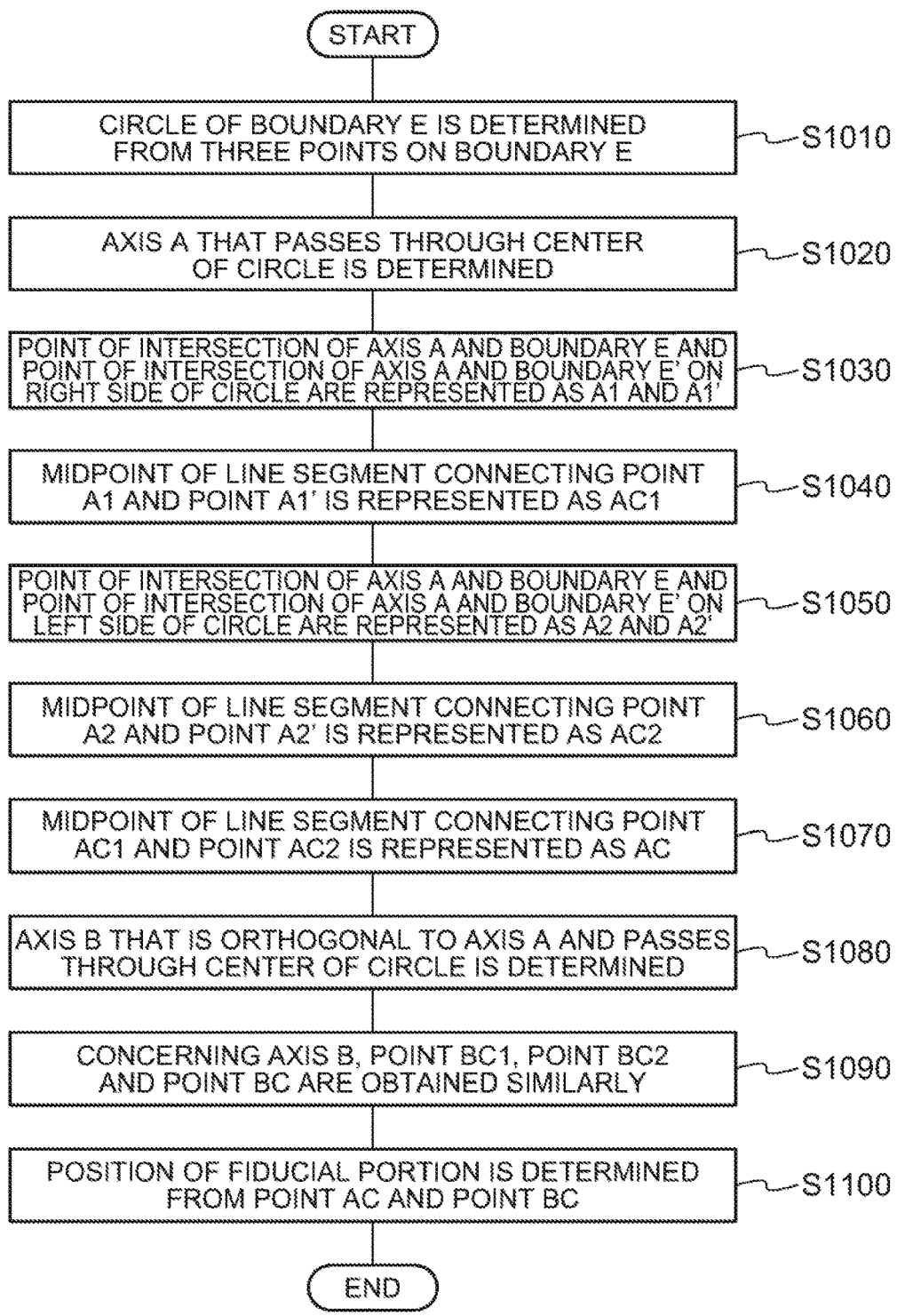
FIG. 19 is a flowchart for illustrating a position determination method according to an embodiment of the present invention.

FIG. 19 is a flowchart for illustrating a position determination method according to an embodiment of the present invention.

Figure 20:
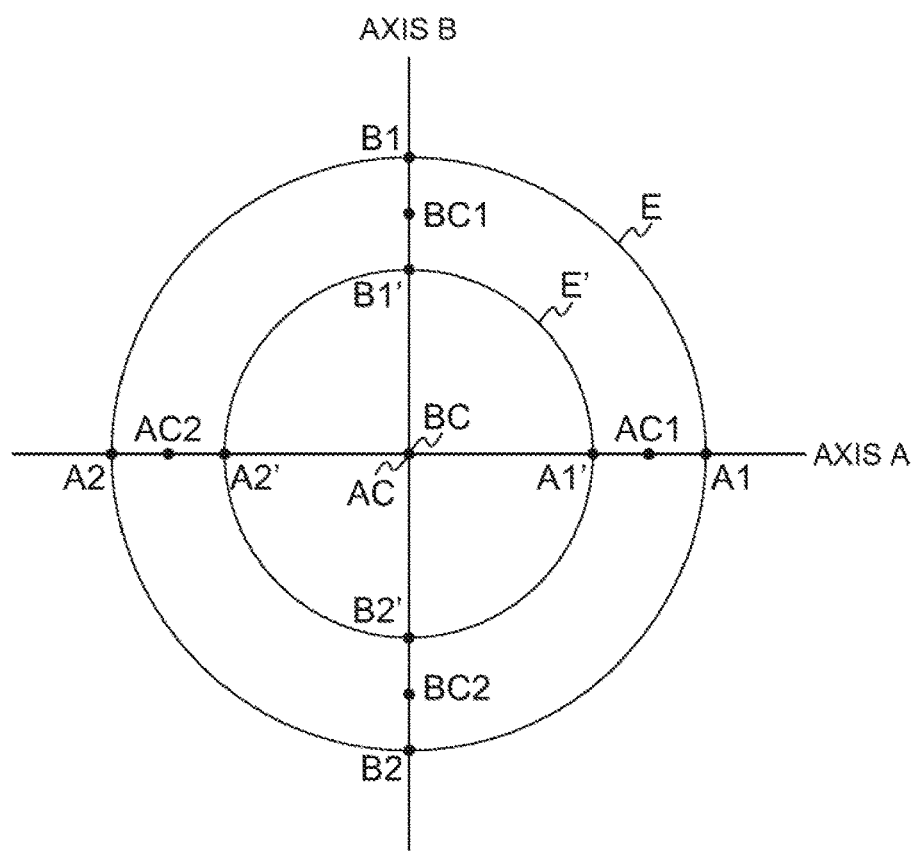
FIG. 20 is a chart that relates the position determination method shown in FIG. 19 to the boundaries E and E'.

FIG. 20 is a chart that relates the position determination method shown in FIG. 19 to the boundaries E and E'.

In step S1010 of FIG. 19, in an image of the measuring system, the circle forming the boundary E is determined from three points on the boundary E.

In step S1020 of FIG. 19, an axis A that passes through the center of the circle is determined. In this case, it is assumed that the axis A is horizontal.

In step S1030 of FIG. 19, the point of intersection of the axis A and the boundary E and the point of intersection of the axis A and the boundary E' on the right side of the above-described circle are represented as A1 and A1' respectively. As described above, the boundary E' is an image of the boundary E, the image being formed by reflection on the side of the pillar 115.

In step S1040 of FIG. 19, the midpoint of the line segment connecting the point A1 and the point A1' is represented as AC1.

In step S1050 of FIG. 19, the point of intersection of the axis A and the boundary E and the point of intersection of the axis A and the boundary E' on the left side of the above-described circle are represented as A2 and A2' respectively.

In step S1060 of FIG. 19, the midpoint of the line segment connecting the point A2 and the point A2' is represented as AC2.

In step S1070 of FIG. 19, the midpoint of the line segment connecting the point AC1 and the point AC2 is represented as AC.

In step S1080 of FIG. 19, an axis B that is orthogonal to the axis A is determined.

In step S1090 of FIG. 19, concerning the axis B, a point BC1, a point BC2 and a point BC are obtained according to the procedure from step S1030 to step S1070.

In step S1100 of FIG. 19, a position of the fiducial portion 110 is determined from the point AC and the point BC. In this embodiment, the main part of the fiducial portion 110 is in the shape of a cylindrical column. Accordingly, the position of the fiducial portion 110 can be determined by regarding the point that has the coordinate in the A axis direction of the point AC and the coordinate in the B axis direction of the point BC as the center of a cross section perpendicular to the axis of the cylindrical column.

As described using FIG. 2, in conventional elements, a position of the top portion of the pillar of the fiducial portion 110 has been used as the fiducial position for measurement. For this reason, an angle of inclination of the pillar causes a variation of the fiducial position.

Table 1 shows angles of inclination of the pillar and corresponding variations of the fiducial position for a conventional element and an element according to an embodiment of the present invention. An angle of inclination of the pillar is an angle of the longitudinal axis of the pillar with a normal to the flat surface 101. The unit of length in Table 1 is millimeter. The length of the pillar is 2.67 millimeters.

TABLE 1

| Angle of inclination | 0.1 | 0.3 | 0.5 | 1 | 3 |
|---|---|---|---|---|---|
| Conventional element | 0.0048 | 0.0145 | 0.0241 | 0.0483 | 0.1450 |
| Element according to an embodiment of the present invention | 0.0000 | 0.0001 | 0.0002 | 0.0004 | 0.0012 |

Figure 21:
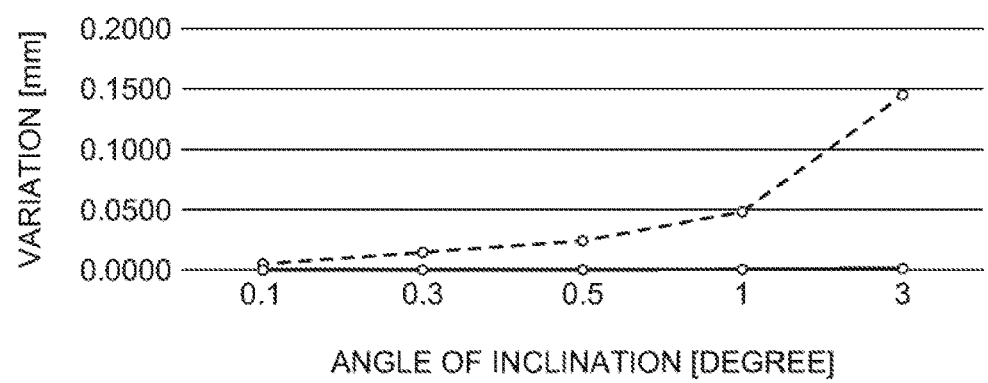
FIG. 21 shows angles of inclination of the pillar and corresponding variations of the fiducial position for the conventional element and the element according to the embodiment of the present invention.

FIG. 21 shows angles of inclination of the pillar and corresponding variations of the fiducial position for the conventional element and the element according to the embodiment of the present invention. In FIG. 21, the variations of the conventional element are represented by the broken line and the variations of the element according to the embodiment of the present invention are represented by the solid line. The variations of the fiducial position due to angles of inclination of the pillar of the element according to the embodiment of the present invention are significantly reduced in comparison with those of the conventional element. According to the embodiment of the present invention, a tolerance of a lens position of ±3 micrometers can be realized for example.

Further, even when the outer boundary of the pillar of the fiducial portion 110 and the periphery of the groove are not concentrically arranged, an error due to a position of the periphery of the groove can be reduced according to the position determination method shown in FIG. 19 and FIG. 20.

Figure 22:
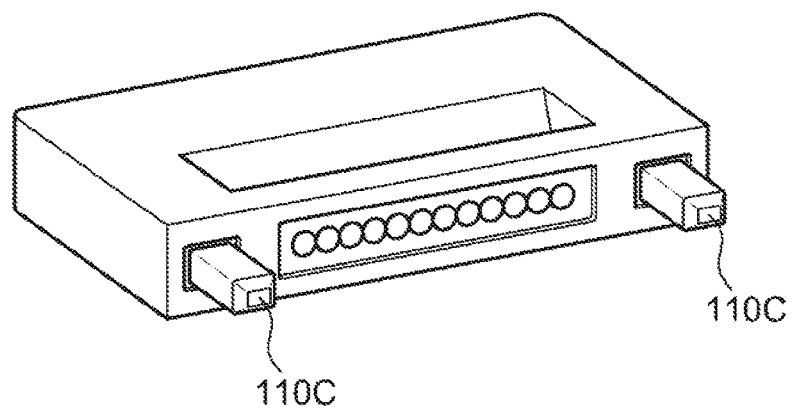
FIG. 22 shows an element 100C provided with fiducial portions 110C according to another embodiment of the present invention.

FIG. 22 shows an element 100C provided with fiducial portions 110C according to another embodiment of the present invention. The two fiducial portions 110C are in the shape of a quadrangular prism. In general, a cross section perpendicular to the longitudinal direction of the pillar of a fiducial portion can be in the shape of a circle or a polygon. Even when a cross section of the pillar of a fiducial portion is in the shape of a polygon, a position of the fiducial portion can be determined by a position determination method similar to that shown in FIG. 19.

What is claimed:

1. A position determination method for determining a position of a point on a flat surface by observing the position of the point and a position of a fiducial portion on the flat surface in an image of a measuring system provided with an imaging optical system using coaxial episcopic illumination, the fiducial portion being in the shape of a pillar at least in the basal portion and being provided with an inclined surface surrounding the foot of the pillar, the position determination method comprising the steps of:

determining a position of the outer boundary of the foot from the boundary between the inclined surface surrounding the foot and the flat surface in the image of the measuring system;

determining the position of the fiducial portion from the position of the outer boundary of the foot; and determining the position of the point with respect to the position of the fiducial portion.

2. The position determination method according to claim 1 wherein when the angular aperture of the image-forming optical system is represented as φ and an acute angle between the inclined surface surrounding the foot and the flat surface is represented as θ, the relationship $\phi<\theta$ is satisfied.

3. The position determination method according to claim 1 wherein when the angular aperture of the image-forming optical system is represented as φ, an acute angle between the inclined surface surrounding the foot and the flat surface is represented as θ, and degree is used as the unit of angle, the relationship $\theta \leq (90-\phi)$ is satisfied.

4. The position determination method according to claim 1 wherein the inclined surface surrounding the foot is configured so as to connect the flat surface and the side of the pillar or to connect the flat surface and another flat surface that is parallel to the flat surface.

5. The position determination method according to claim 4 wherein when the inclined surface connects the flat surface and the side of the pillar, the angular aperture of the image-forming optical system is represented as φ, the length of the inclined surface in the direction perpendicular to the central axis of the pillar in a cross section containing the central axis of the pillar is represented as X, and the length of the pillar is represented as L, the relationship $X \leq L \tan(\phi/3)$ is satisfied.

6. The position determination method according to claim 1 wherein the position of the point is a point on an optical element.

7. An element provided with at least two fiducial portions and an optical element, the fiducial portions and the optical element being installed on a flat surface or a plurality of flat surfaces that are parallel to one another wherein each fiducial portion is in the shape of a pillar at least in the basal portion and provided with a inclined surface surrounding the foot of the pillar and an angle of the inclined surface with the flat surface on which said each fiducial portion is installed ranges from 20 degrees to 70 degrees, wherein the inclined surface surrounding the foot of the pillar is configured so as to connect the flat surface on which said each fiducial portion is installed and the side of the pillar or to connect the flat surface on which said each fiducial portion is installed and another flat surface that is parallel to the flat surface.

* * * * *